United States Patent

[11] 3,578,851

| [72] | Inventor | Christian Jensen<br>Oslo, Norway |
|---|---|---|
| [21] | Appl. No. | 641,039 |
| [22] | Filed | May 24, 1967 |
| [45] | Patented | May 18, 1971 |
| [73] | Assignee | MPO Videotronics, Inc.<br>New York, N.Y. |

[54] AUTOMATICALLY THREADED FILM APPARATUS INCORPORATING A PROJECTION APPARATUS AND A PRE-THREADED FILM CARTRIDGE ASSEMBLY
10 Claims, 11 Drawing Figs.

[52] U.S. Cl............................................. 352/72,
352/29, 352/157, 352/159
[51] Int. Cl. ........................................... G03b 23/02
[50] Field of Search.......................................... 352/29, 30, 72, 78, 157, 158, 159

[56] References Cited
UNITED STATES PATENTS

| 1,262,611 | 4/1918 | Krug............................... | 352/157 |
| 3,375,054 | 3/1968 | Hughes.......................... | 352/72X |
| 3,375,055 | 3/1968 | Hughes.......................... | 352/29X |

*Primary Examiner*—John M. Horan
*Assistant Examiner*—Monroe H. Hayes
*Attorney*—Jacobi, Davidson & Kleeman ABSTRACT: An automatically threaded film apparatus having a projection apparatus and a prethreaded film cartridge assembly intended to be detachably mounted at the projection apparatus. Owing to the synchronous feeding out, running and winding up of the film on the same shaft the film is not exposed to friction, wear and tear. Moreover, mechanism is provided to insure that the film automatically adjusts itself to a desired frame separation between a film gate assembly and a sound head. Simple operation of the unit is insured for by the overall arrangement wherein a common control knob or the like initiates various operations required for reliable visual and/or sound reproduction.

PATENTED MAY 18 1971

INVENTOR
Christian Jensen

BY Jackie & Davidson

ATTORNEYS.

INVENTOR
Christian Jensen

Jacobi & Davidson

BY

ATTORNEYS.

INVENTOR
Christian Jensen
BY Jacobi & Davidson
ATTORNEYS.

AUTOMATICALLY THREADED FILM APPARATUS INCORPORATING A PROJECTION APPARATUS AND A PRE-THREADED FILM CARTRIDGE ASSEMBLY

BACKGROUND OF THE INVENTION

The present invention relates to automatically threaded film apparatus, and finds particular utility when applied to motion picture apparatus. The invention apparatus is of the type incorporating a projection apparatus and a prethreaded film cartridge assembly intended to be detachably mounted at the projection apparatus.

Various types of motion picture apparatus adapted to controllably feed a film therethrough for visual and/or sound reproduction of the recorded media on the film have heretofore been provided. Conventionally, such equipment includes a light projection station and a sound reproducing station, each of which stations is adapted to receive a film and reproduce, respectively, a visual display and a sound recording. Moreover, the conventional apparatus incorporates a series of guides and rollers past which the film must be fed for proper guiding in a predetermined path to and from the projection station and the sound reproducing station.

In the use of the ordinary film supply comprising a roll of film, a length of film from the supply is fed over the rollers and the guides manually and then passed, for example, to a takeup reel. This operation requires considerable time and manual dexterity, and, moreover, once a given film supply has been used, the same must be rewound on the initial supply roll to restore it to initial condition for future use.

There have been suggestions as to the provision of an automatic threading device for use with motion picture apparatus which eliminates, at least partially, the manipulations required to feed the film through and over the guides and rollers, but in this instance, the basic apparatus must incorporate additional means and elements thereby substantially increasing the cost thereof. Moreover, even with the automatic threading assemblies, there still must be a rewinding of the film for future use, and thus, there is a lost time factor in using such apparatus, aside from the increased expense resulting from the additional means and components necessarily incorporated therein.

Appreciating the foregoing, it has also previously been suggested that an endless film magazine be provided for use with motion picture apparatus. Such endless film magazine has a returning loop extending therefrom, which loop can be passed over guides and rollers for proper travel through the motion picture apparatus. With the endless film type arrangement, there is no need for rewinding, because the film travels essentially in a continuous path. Still with this arrangement, it is necessary to initially manipulate the film over the guides and rollers as each magazine is operatively associated with a particular motion picture apparatus. Thus, even in this instance, there is substantial time lost in changing from one magazine to another, and the operator must have good manipulating ability to properly "thread" the film.

Notwithstanding the time problems faced with prior endless film supply arrangements, such arrangements have found somewhat widespread use in industrial circles and, particularly by salesmen and other individuals desiring to present a subject pictorially in connection with sound, or simply desiring to play a sound tape for descriptive or other purposes. Still, if the particular subject matter in question cannot be stored or recorded on a single coil of film or tape, then it becomes necessary to change coils or tape and as indicated above, this has presented a serious problem, because even though the endless film type magazine eliminated the rewinding problem, it still required the manual threading and looping of film through the projection means and/or recording and playback means of the apparatus with each tape or film change.

SUMMARY OF THE INVENTION

Accordingly, the present invention is directed to the provision of an improved apparatus which is free of all of the aforesaid disadvantages, and which conveniently permits the selective change from one endless film supply to another with a given motion picture apparatus. In essence, this invention constitutes a simplification and improvement of the apparatus structure of the commonly assigned, copending U.S. Pat. application Ser. No. 386,036, now abandoned of one of the coinventors herein, Donald G. Woelfel, entitled "Automatically Threaded Film Apparatus," which application also was directed to an improved apparatus for overcoming the shortcomings of the prior art structures theretofore known. While the automatically threaded film apparatus of the aforementioned copending U.S. Pat. application already constitutes a considerable improvement over the prior art structures, the apparatus of the invention aims at even further simplifying the operation of an automatically threaded film apparatus and to provide a structure which is not only extremely simple to operate but possesses a construction which insures for proper playback of the visual and/or sound media carried by the film, and further, manifests itself through economy in manufacture and assembly.

Therefore, a more specific object of the present invention is to provide a projection apparatus and a prethreaded film cartridge assembly adapted to be conveniently detachably associated with the aforesaid projection apparatus, whereby a plurality of different films can be associated with a plurality of detachable prethreaded film cartridge assemblies so that an operator can conveniently change from film to film by merely coupling the loaded film cartridge assembly to a basic projection apparatus.

Another significant object of the present invention is to provide an improved motion picture apparatus of the type described and incorporating a projection apparatus and a prethreaded film cartridge assembly capable of being detachably mounted at the projection apparatus and wherein operation of a single control knob or lever serves to: fix the film in the gate assembly, operate a stabilizer assembly to insure for a proper desired frame separation between the gate assembly and the sound head, place the film into operable association with the sound reproducing device incorporating a sound roller and the sound head, and start the machine or projection unit into operation.

Still a further significant object of the present invention concerns itself with an improved automatically threaded film apparatus incorporating a projection apparatus and a prethreaded film cartridge assembly wherein mechanism is provided to insure that the film will automatically adjust itself to a desired frame separation between the film gate assembly and the sound head when the prethreaded cartridge assembly is detachably mounted at the projection apparatus.

A further noteworthy object of the present invention is to provide an automatically threaded film apparatus having a basic projection apparatus and a prethreaded film cartridge assembly intended to be detachably mounted on the projection apparatus and wherein the film is synchronously fed out, run and wound up on the same shaft or the like, so that the film is not exposed to any considerable friction, wear and tear as was previously the case in prior art structures.

An additional important object of the present invention relates to an improved prethreaded film cartridge assembly incorporating a stabilizer means which insures for proper frame separation between a film gate assembly and the sound head of the sound reproducing device.

A further significant object of this invention relates to an improved prethreaded film cartridge assembly for carrying an endless supply of film wherein the actual film supply is located in a first compartment disposed substantially parallel to a second compartment in which the film loop is caused to pass in a prescribed path of travel during reproduction of the information carried on the film supply.

A further equally significant object of the present invention concerns a prethreaded film cartridge assembly having a stabilizer assembly for insuring proper frame separation between a gate assembly and the sound head, and further, wherein there is additionally provided a loop compartment intended to receive a film loop which is momentarily formed between a roller of the stabilizer assembly and the gate assembly when the aforementioned desired frame separation is undertaken.

Generally speaking, and considering the inventive structure in its broader aspects such comprises, in combination, a projection apparatus having at least a gate assembly thereon, and a prethreaded film cartridge assembly capable of being detachably mounted at the aforesaid projection apparatus. More specifically, film supply means are carried by the film cartridge assembly, and such film supply means has a film loop extending therefrom and guided by appropriate guide means through a prescribed path of travel in the film cartridge assembly. Cooperating drive means on the projection apparatus and the film cartridge assembly insure for appropriate driving of the film supply means during operation of the projection apparatus. According to a preferred manifestation of the present invention, the drive means of the projection apparatus incorporates a drive assembly having a drive stub shaft and a drive pin and the drive means of the prethreaded film cartridge assembly includes a transport pulley having an aperture or bore for receiving the aforesaid drive stub shaft and a series of fan holes for receiving the drive pin. This transport pulley is operably associated with a spool ring carrying the supply of tape, so that when a positive driving connection is established between the cooperating drive means of the projection apparatus and the prethreaded cartridge assembly the supply of film is simultaneously paid off and wound up upon the spool ring.

The inventive prethreaded film cartridge assembly further incorporates a stabilizer assembly which is displaceably or pivotably mounted at the housing of the cartridge assembly and includes a stabilizer roller at one end past which moves the film. This stabilizer assembly is preferably spring loaded in order to tension and form to desired size the film loop at the drive side of the cartridge assembly, so that with subsequent adjustment or slight lifting of the spring-loaded stabilizer assembly, in other words when operating the control knob, there is insured for a desired frame separation between the gate assembly and the sound head, thereby synchronizing the picture and sound track. Moreover, according to a further aspect of the invention the prethreaded film cartridge assembly contemplates the provision of a so-called loop compartment intended to receive a loop of the film which is initially formed when the aforementioned desired frame separation between gate assembly and sound head is undertaken and at the time that the projection apparatus is placed into operation. Significantly, the control knob or equivalent structure which starts the machine or projection apparatus running, also serves to displace the stabilizer assembly against the action of the exerted spring force into a position where the desired frame separation between gate assembly and sound head can be provided, further effectuates fixation of the film in the gate assembly, and also brings the film into operable association with the sound reproducing device at the projection apparatus.

BRIEF DESCRIPTION OF THE DRAWINGS

The invention will be better understood, and objects other than those set forth above, will become apparent, when consideration is given to the following detailed description thereof. Such description makes reference to the annexed drawings wherein.

DESCRIPTION OF THE PREFERRED EMBODIMENT

A. General Arrangement

In considering the inventive automatically threaded film apparatus it is to be distinctly understood that only enough of the physical structure thereof has been illustrated in the drawings and will be described hereinafter to enable one skilled in the art to readily understand the underlying concepts of the present invention.

Figure 1:
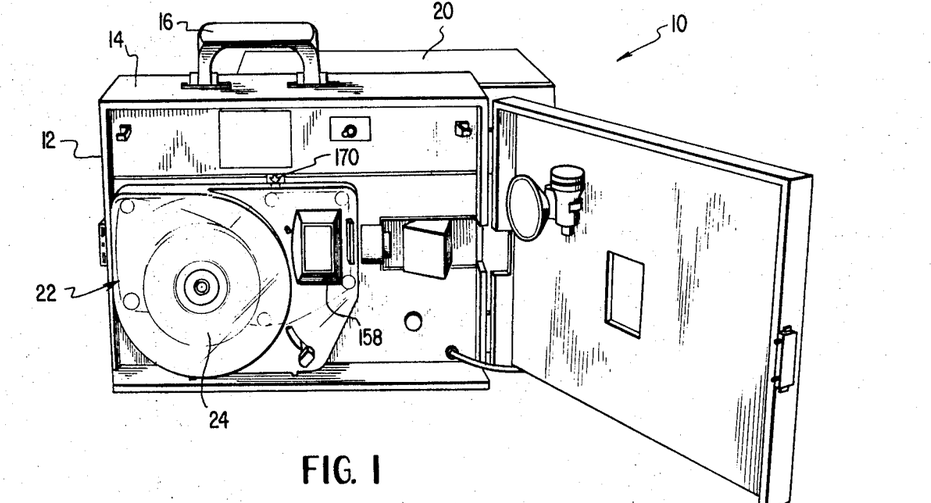
FIG. 1 is a front perspective view of the overall inventive apparatus structure incorporating the projection apparatus and the prethreaded film cartridge assembly as the latter appears when mounted at the projection apparatus.
Figure 2:
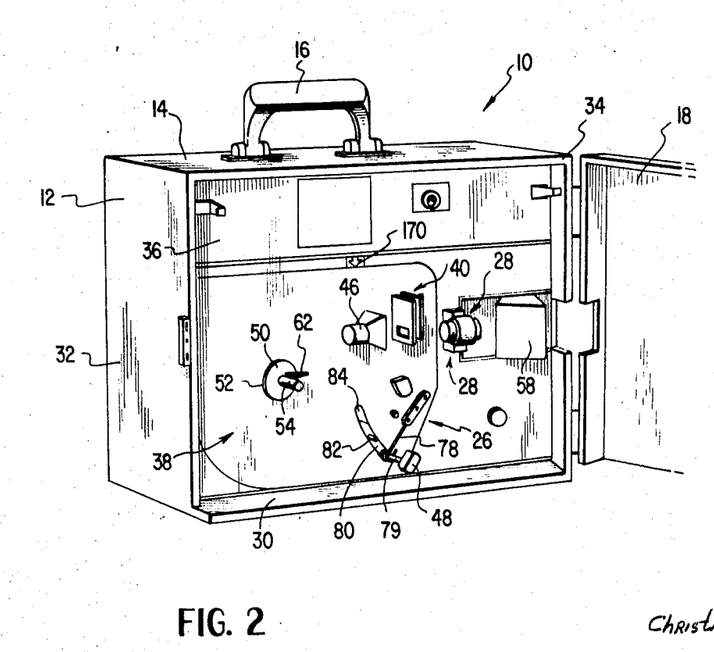
FIG. 2 is a perspective front elevational view of the projection apparatus with the lamp cover thereof removed and also the inventive prethreaded film cartridge assembly.

Broadly speaking, by referring to FIGS. 1 and 2, it will be recognized that such apparatus comprises a portable motion picture projection unit or projector 10 incorporating an attractive casing 12 provided at the upper end or wall 14 with a suitable carrying handle 16. The front of the casing 12 may be closed by a hingedly connected cover or door 18, whereas at the rear of the aforesaid casing 12 there is displaceably arranged a projection screen unit 20 of known construction. Of course, the casing 12 will have mounted therein the usually required equipment for proper operation of the entire automatically threaded film apparatus, such as drive means, speakers and so forth.

Further, a prethreaded film cartridge assembly 22 is detachably mounted at the motion picture projector 10. This prethreaded cartridge assembly 22 serves to properly guide an endless supply of film 24 past the usual sound reproducing device 26 and the projection lens system 28, both of which may be of conventional construction, in order to audibly reproduce the sound media carried by the film 24 as well as to visually depict at the projection screen unit 20 the pictorial representation borne by such film. Naturally, a separate screen could be provided in lieu of the projection screen unit 20, yet since it is desirable to have a compact assembly which is generally no larger than a small suitcase and capable of projecting the film and audibly reproducing the sound thereon, it may be assumed that all of the components necessary to achieve this result are provided or carried at the automatically threaded film apparatus of the invention.

B. Description of the Projection Apparatus

Having now had an opportunity to generally consider the overall arrangement of the inventive structure, attention is specifically invited to FIG. 2 depicting in greater detail a preferred construction of the motion picture projector 10. Specifically, it should be understood that in the exemplary embodiment the casing 12 is of substantially rectangular configuration, embodying not only the upper wall portion 14 but further the opposite parallely arranged base or bottom portion 30 as well as the two upstanding, spaced parallel side portions 32 and 34, at the latter of which there is hingedly mounted the previously mentioned door or cover 18. Spaced inwardly of the open end of the casing 12 facing the operator and extending substantially vertically between the upper wall portion 14 and lower wall portion 30 of such casing is a stationary vertical partition wall 36.

Partition wall 36 advantageously divides the casing 12 into two compartments, namely a first compartment 38 disposed forwardly of such partition wall 36 and open in the direction of the door or cover 18, and a second compartment (not visible) which is behind such vertical partition wall 36. In the confines of the first compartment 38 there is intended to be placed the inventive prethreaded film cartridge assembly 22 and there is also mounted therein, among other things, the sound reproducing device 26, the projection lens system 28, the gate assembly 40, the film advancing claw 42, the frame adjusting lever 44, the lamp 46, the control handle or operating lever structure 48, the drive assembly 50 for the film supply, the pivotally mounted reflecting prism or mirror structure 58, as well as other structure necessary for the proper operation and control of the sound and visual reproduction, as is standard in equipment of this type. Behind the vertical partition wall 36 in the nonvisible second compartment there is arranged the usual drive structure and associated mechanism required for the proper functioning of the equipment, and since only a portion thereof is necessary for understanding the overall operation and physical structure of the invention, those details of specific structure located behind this partition wall 36 will be explained later to the extent necessary.

As is conventional with this type of apparatus, the drive assembly 50 is driven in synchronism with the film advancing claw 42, and structure suitable for this purpose is well known in the art, so that it need not be set forth in any greater detail herein. Now, insofar as the structure of the drive assembly 50 which is which operably associated with the nonillustrated drive mechanism is concerned, it will be appreciated that such comprises a rotatable plate 52 having an integral, centrally arranged stub shaft 54 intended to engage with a suitable bore 186 (FIG. 4) of a transport pulley 178 driving a tape supply core or spool ring 198 (FIG. 5), as will be more fully explained hereinafter. Additionally, the drive plate 52 also carries at the region of the periphery a projecting conical pin or spike 62 which fits in one of a plurality of suitable holes 188 at the aforesaid transport pulley 178, the latter also carrying thereon the conventional sprocket wheel 182 having the individual, circumferentially spaced sprocket teeth 184—here assumed to be 40 in number—intended to engage with appropriate sprocket holes or openings at the film 24.

Figure 8:
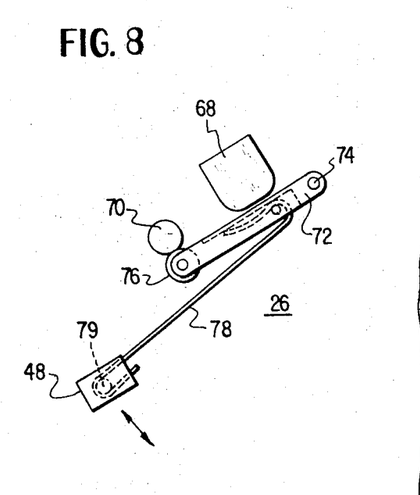
FIG. 8 schematically depicts details of the sound reproducing device incorporating the sound roller and the sound head arranged at the projection apparatus.

It will be recalled that the projection apparatus 10 is equipped with a sound reproducing device 26 which, as best shown in FIG. 8, comprises a standard sound head 68 and sound roller 70 adjacent thereto. As is conventional, this sound roller 70 has a fly wheel mounted at the back thereof behind the partition wall 36 in order to keep the sound flutterless. Beneath the sound head 68 and sound roller 70 there is located a pivotably mounted support 72, preferably formed of plastic for instance. Plastic support 72 is hingedly mounted to the vertical partition wall 36 by means of the pivot shaft 74 and carries at its free end a freely rotatable roller 76 intended to press the film 24 passing between the sound roller 70 and such roller 76 against the aforesaid sound roller 70 during sound reproduction. It will further be seen that a spring 78 is attenuated between the plastic support 72 and the shaft 79 (FIG. 2) of the operating or control lever 48. It will be seen that this shaft 79 is affixed to a lever member 80 carrying a pin 82 projecting through an arcuate slot 84 formed at the vertical partition wall 36, the function of which pin 82 will be considered shortly hereinafter. When the operating lever 48 is in its lowermost position at the bottom of the arcuate slot 84 the spring 78 biases the support 72 and the roller 76 carried thereon away from the sound roller 70, opening the area between these members so that the film 24 can be inserted therebetween. On the other hand, when the control or operating lever 48 is moved upwardly in the slot 84, spring 78 biases the support 72 upwards so that roller 76 urges the film 24 to bear against the periphery of the sound roller 70 and maintains such thereat during sound reproduction.

Figure 9:
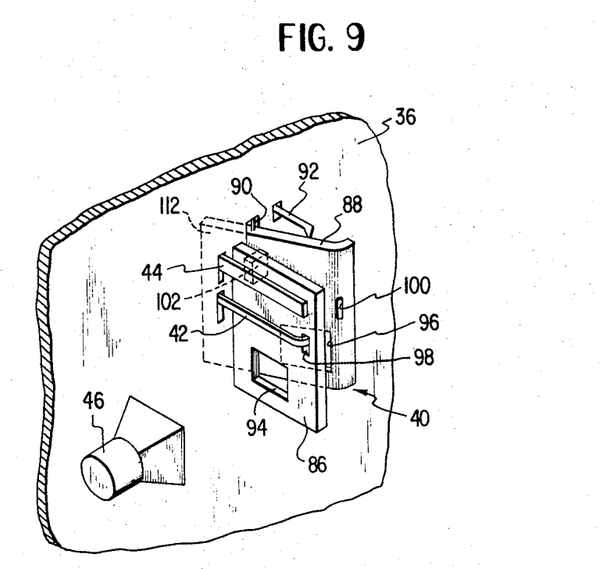
FIG. 9 schematically depicts details of the gate assembly provided at the projection apparatus.

It will be recalled that the gate assembly 40 is disposed above the sound reproducing device 26. By referring to FIG. 9 showing details of this gate assembly 40 it will be recognized that such comprises a stationary gate plate 86 fixed to the vertical partition wall 36 and adjacent thereto a pivotably mounted gate 88, the pivot axis or shaft of which is designated by reference numeral 90. As is conventional, the film 24 passes between the gate plate 86 and the pivotable gate 88 which, during film projection, is in its closed position and urged towards the gate plate 86 by means of a spring-biased finger 92 or equivalent structure. As is usual, both the gate plate 86 and the pivotal gate 88 are provided with aligned windows 94, 96 through which the bundle of light rays from the lamp 46 can pass in order to project the image on the film 24 moving past the aforesaid windows 94 and 96 into the projection lens system 28 located forwardly of the gate assembly 40. As is further conventional, both the gate plate 86 and the pivotal gate 88 are provided with a respective elongate claw slot 98 and 100 which are aligned with one another and through which passes the conventional film advancing claw 42. It will be appreciated that the film advancing claw 42 and the drive assembly 50 for the feed of the supply of film are driven in synchronism with one another as is usual. Mechanism for this purpose is already known to the art and therefore it may be assumed that any of the known structures providing for such synchronous drive can be utilized, and since this aspect of the operation does not form part of the inventive subject matter no further discussion thereof is believed necessary. Additionally, it will be recognized that at the rear region of the gate assembly 40 there is disposed a microswitch 102 which is advantageously situated in the path of movement of the film passing between the gate plate 86 and pivotal gate 88 and is designed to cooperate with a suitable notch provided at the film, for instance at the end of the film, in order to shut off the entire machine when the notch passes the microswitch 102, inasmuch as the latter will then open the power circuit to the driving apparatus. Also, as should be evident, if the film would break then the same stop action would be exerted upon the machine.

Figures 10, 11:
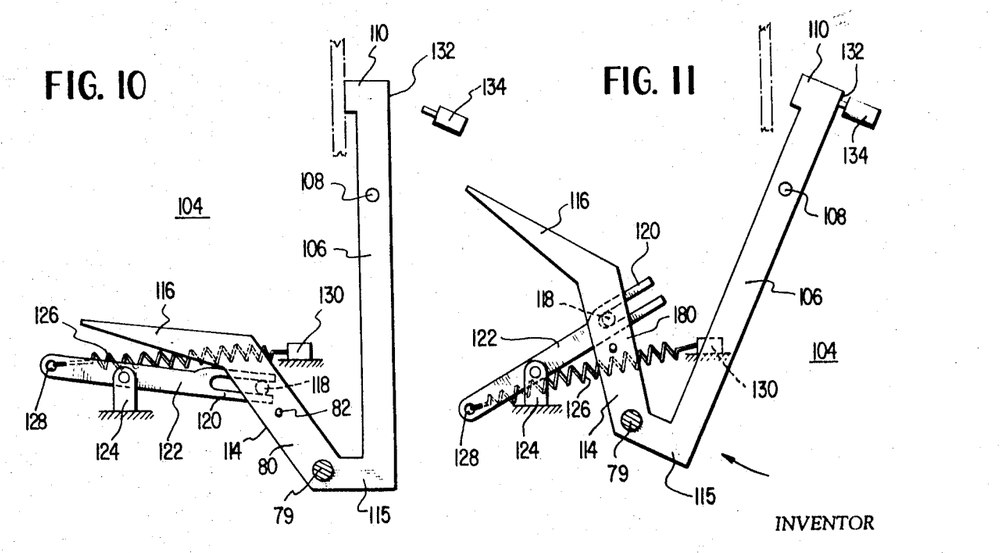
FIG. 10 schematically depicts one possible form of lever arrangement for controlling the operation of the gate assembly and for starting the projection apparatus, wherein such lever arrangement is depicted in a position where the gate is pivoted away from the gate plate and at such time as the associated control knob is in its lowermost position.
FIG. 11 depicts the lever arrangement of FIG. 10 in a different position, namely where the control knob has been raised into a position for starting the machine into operation and where the gate is freed to fix the film in the gate assembly.

It should be self-evident that unless the gate 88 is pivoted away from the gate plate 86 during such time as the prethreaded film cartridge assembly 22 is fitted on to the projection apparatus 10 the film 24 cannot be inserted between the aforesaid stationary gate plate 86 and pivotal gate 88. Consequently, it is necessary to provide mechanism for maintaining the pivotal gate 88 away from the gate plate 86 prior to mounting of the prethreaded cartridge assembly 22. Mechanism suitable for this purpose and depicted purely by way of example is shown in FIGS. 10 and 11. It is to be distinctly understood that the construction depicted therein is merely illustrative of one possible form of physical structure, since it should be quite obvious that completely different linkage or lever means may be provided to bring about the same result. In FIGS. 10 and 11, the depicted lever system 104 employed to pivot the gate 88 into its open position is located behind the vertical partition wall 36 and is illustrated in the manner such would be seen if viewed from the front of the projection apparatus 10 with the vertical partition wall 36 removed. Specifically, FIG. 10 depicts the lever system 104 in a position where the gate 88 is pivoted into its open position. It will be seen that the lever system 104 comprises the lever member 80 having an upright leg 106 carried at a pivot shaft 108. At the upper end of the lever arm 106 there is provided a nose member 110 intended to bear against the rear portion or edge 112 (FIG. 9) of the pivotal gate 88, which rear edge piercingly extends through the vertical partition wall 36 to the back side thereof where the lever system 104 is disposed. Further, the lever member or means 80 has an upwardly inclined portion 114 which merges via a substantially horizontal portion 115 with the upright lever arm 106 and, in turn, terminates in a further laterally depending lever portion 116. At the rear face of the upwardly inclined lever portion 114 there is fixedly mounted a pin member 118 straddled by the bifurcated end or head 120 of a holding lever or toggle 122. As shown, the latter is pivotably mounted at a pivot member 124, and a spring 126 has one end in engagement with the rear 128 of the holding lever 122 and the opposite end affixed to a suitable stop or spring retainer 130.

Now, it is remarked that in the position of the lever system 104 of FIG. 10 the control knob or lever 48 is in its lowermost position in the arcuate slot 84, and the holding lever 122 is in the position substantially shown. Accordingly, it will be recognized that the line of action of the spring 126 exerts a clockwise moment on the lever 122, thereby urging the lever member 80 to rock in counterclockwise direction about the pivot shaft 108 so that the nose member 110 bears against the protruding rear edge or portion 112 of the pivotal gate 88. Consequently, this gate 88 is rocked about its pivot shaft 90, carried for instance at the vertical partition wall 36, against the action of the spring-biased finger 92 so that pivotal gate 88 moves away from the stationary gate plate 86. Hence, a slot or opening appears between the confronting stationary gate plate 86 and the pivotal gate 88 which is capable of receiving therebetween a portion of the film 24.

Now, in order to again close the thus opened pivotal gate 88 the control knob or operating lever 48 is moved upwardly in the arcuate slot 84, so that the lever system 104 assumes the position shown in FIG. 11. When this happens the toggle or holding lever 122 is pivoted in counterclockwise direction owing to the action of the pin 118 at the bifurcated head 120 so that the spring 126 biases the aforesaid holding lever 122 in counterclockwise direction to thus maintain the operating lever 48 in the up position. As will be further apparent, owing to the upward displacement of the lever portion 114 under the action of the just-considered movement of the operating lever 48 the lever arm 106 is rocked in clockwise direction, bringing the nose portion 110 out of engagement with the depending rear or flap portion 112. The spring-biased finger 92 then urges the pivotal gate 88 into its closed position towards the gate plate 86. Moreover, it will be seen that when the lever arm 106 is rocked in clockwise direction, to assume the position shown in FIG. 11, the rear face 132 of the upright lever arm 106 engages with a microswitch 134 coupled in the power supply circuit of the projection apparatus, thereby closing such microswitch 134 in order to feed power to the various components of the machine necessary for the proper operation thereof.

C. Description of the Prethreaded Film Cartridge Assembly

At the outset of the specification it was remarked that the projection apparatus 10 is advantageously provided with a prethreaded film cartridge assembly 22 which may be detachably mounted thereat. Now there will be fully explained the physical structure of the preferred form of such prethreaded film cartridge assembly 22. Specifically, in FIG. 3 the film cartridge assembly 22 is shown from the side facing the operator of the machine when such is mounted at the projection apparatus 10, whereas FIG. 4 depicts the same cartridge assembly from the reverse side, in other words, flipped over through 180° about a substantially vertical axis from the position shown in FIG. 3. More precisely, the prethreaded film cartridge assembly 22 of these FIGS. comprises a cartridge housing or casing 136, preferably formed of a molded transparent plastic, such as polystyrene, and is divided into two portions or compartments 140, 142 by a vertical partition wall 138. The first compartment 140 may conveniently be considered as located at the spool side and the second compartment 142 at the drive side. Further, the cartridge housing 136 incorporates a peripheral rim portion 144 encircling the drive side or second compartment 142.

At the front wall 146 of this peripheral rim portion 144 there is disposed an arcuate or substantially semicircular shaped slot 148 which, when the cartridge assembly 22 is mounted at the projection apparatus 10, is in alignment with the standard frame windows 94, 96 of the gate assembly 40 and the projection lens system 28 disposed forwardly of the aforesaid front wall 146. Beneath the aforesaid semicircular recess 148 there is located at this front wall 146 a so-called loop compartment 150, the function of which will be more fully developed at a later portion of this disclosure. Opposite the aforesaid loop compartment 150 there is arranged a film guide roller 152 and beneath such a pivotal film guard plate 154 which may be pivoted or rocked into the upright or vertical position during threading of the film in the cartridge assembly 22. It will further be seen that the vertical partition wall 138 is provided with an appropriately configured opening or recess 156 intended to piercingly receive the lamp cover 158 depicted in FIG. 1. At the vertical partition wall 138 and between the edge 160 of the lamp cover receiving opening 156 and the front wall 146 of the cartridge casing 136 there is disposed a vertically extending slot 162 terminating at its upper end in a widened portion 164. Vertical slot 162 is configured to receive the forward protruding edge of the gate plate 86 and the frame adjusting lever 44.

To facilitate mounting of the cartridge assembly 22 at the projection apparatus 10, it will be noticed that the upper rim portion 166 of the enclosing rim 144 of the cartridge casing 136 may be provided with a pair of spaced marker lines 168, or equivalent structure, intended to be brought into alignment with an arrowhead or other marker 170 located at the vertical partition wall 36 of the projection apparatus 10, so that the lamp cover opening 156 and vertical slot 162 may be easily placed into alignment with the lamp cover 158, and gate plate 86 and frame adjusting lever 44 respectively. Furthermore, it will be noticed that a substantially T-shaped slot 172 is located at the cartridge partition wall 138 beneath the lamp cover opening 156. This substantially T-shaped slot 172 includes an enlarged portion 174 intended to receive the control knob or lever 48 when the latter is located in its lowermost position in its associated arcuate slot 84. Hence, it will be also apparent that the cartridge casing 136 only may be mounted at the projection apparatus 10 when the operating or control lever 48 is in its lowermost position, aligned with the enlarged opening 174, which, in effect means, there is insured that the gate 88 is pivoted into its open position away from gate plate 86 so that a portion of the film 24 can be inserted between these two members.

Figure 4:
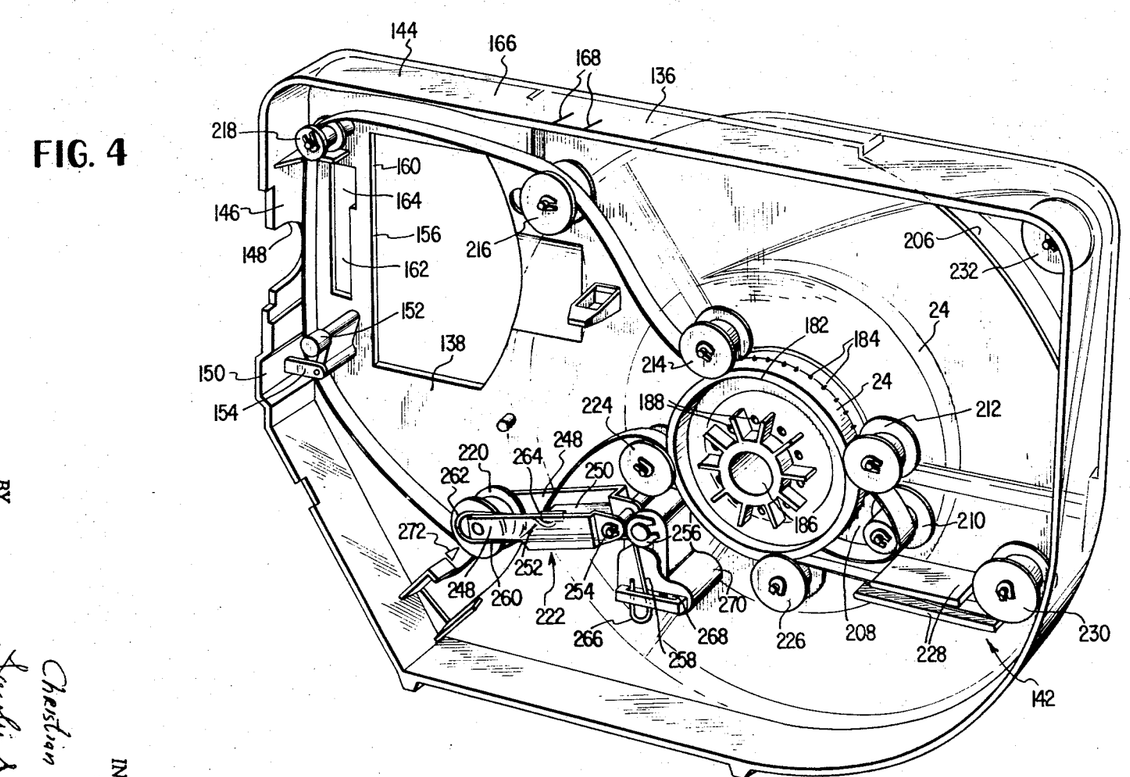
FIG. 4 is a perspective front view of the prethreaded film cartridge assembly of FIG. 3 seen from the reverse side, in other words as if flipped over about a vertical axis through approximately 180°.
Figure 5:
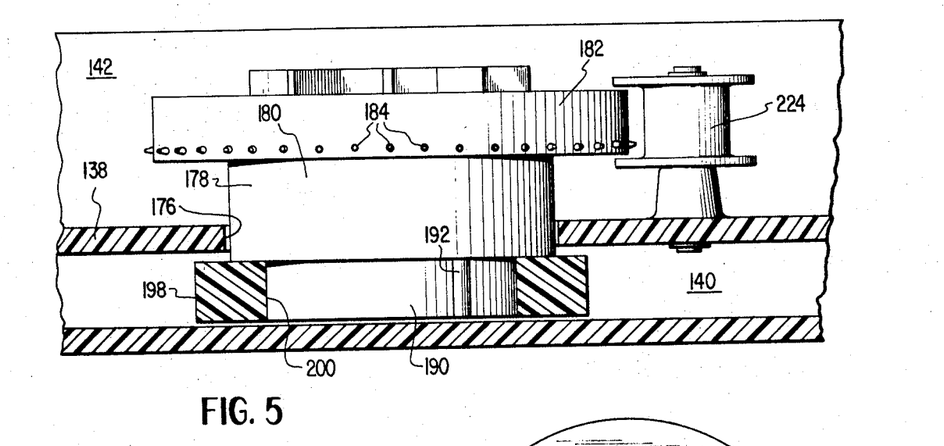
FIG. 5 is a fragmentary, partially cross-sectional view showing details of the transport pulley and spool ring for the tape supply provided at the prethreaded film cartridge assembly.
Figure 6:
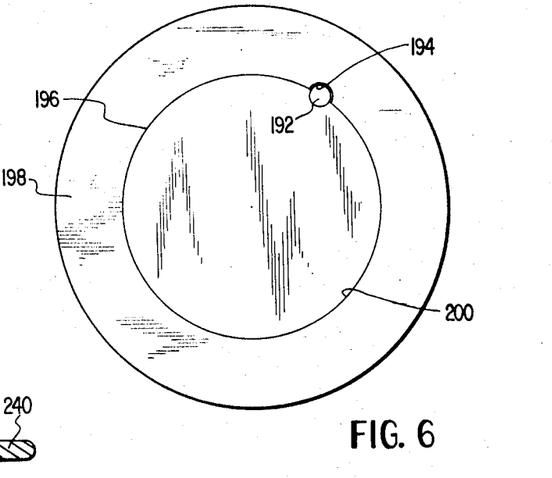
FIG. 6 is an end view showing details of the positive coupling connection between the transport pulley and the spool ring for the tape supply.

By now referring to FIGS. 4 to 6 it will be recognized that the vertical cartridge partition wall 138 is provided with an enlarged opening or hole 176 intended to receive the transport pulley 178, also preferably formed of a molded transparent plastic, such as polystyrene, with the size of the opening 176 advantageously being slightly larger than the diameter of said transport pulley 178 so that the latter is mounted therein with somewhat of a loose fit. Transport pulley 178 includes a first pulley portion 180 which extends into the drive side or second compartment 142 and carries thereon, preferably integral therewith, an enlarged sprocket wheel 182 having a plurality of circumferentially spaced sprocket teeth 184 thereon, which it will be recalled in this instance was assumed to be 40 sprocket teeth for instance. As is conventional, the sprocket teeth 184 engage with appropriate sprocket openings at the film 24 in order to transport such in the usual manner. Continuing, this first pulley portion 180 is provided at its one face, forwardly of the sprocket wheel 182, with the central bore 186 intended to receive the drive stub shaft 54 of the drive assembly 50. Furthermore, as previously developed a plurality of fan holes or openings 188 are circumferentially disposed about the central bore 186, and these fan holes 188 are intended to receive the driving spike or pin 62 of the aforesaid drive assembly 50. It should be apparent that when the central bore 186 is fitted onto the drive stub shaft 54 and one of the fan holes 188 receives the driving spike 62 there is established a positive driving connection between the transport pulley 178 and the drive assembly 50.

Just as the transport pulley 178 was described as having a first pulley portion 180 extending into the drive side or second compartment 142 it also has a smaller diameter, second pulley portion 190 protruding into the spool side or first compartment 140. As best seen by inspecting FIG. 6, this second pulley portion 190 carries a key, here in the form of a fixed pin member 192 intended to engage with an appropriately configured recess or opening 194 provided at the inside wall 196 of an annular core or spool ring member 198 providing a hub for carrying the endless supply of tape 24. The annular core or spool ring 198 is provided with a central bore 200 intended to piercingly receive the second pulley portion 190 when the pin 192 and recess 194 are properly aligned. The aforesaid members 192, 194 then providing a positive driving connection between the transport pulley 178 and spool ring or annular core 198, so that as the sprocket wheel 182 is rotated the tape supply 24 is also simultaneously paid off and wound up respectively.

Figure 3:
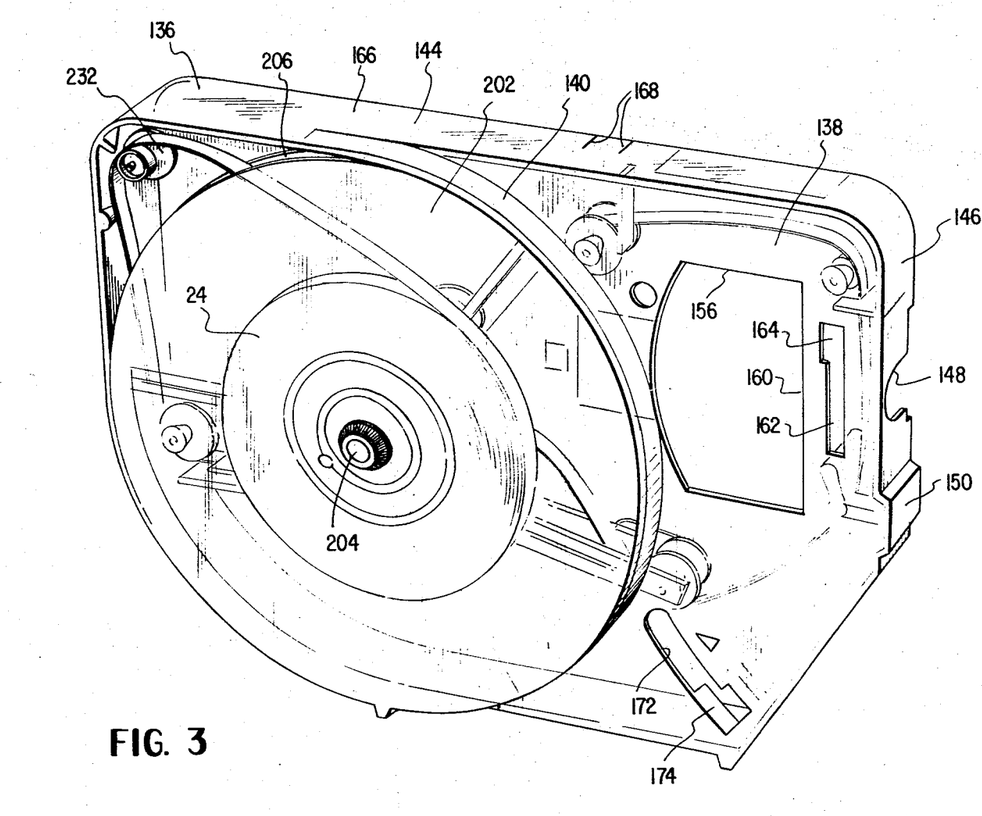
FIG. 3 is a perspective elevational view of the prethreaded film cartridge assembly intended to be employed with the projection apparatus of FIG. 2 and as viewed from the front by the operator in a position when it is mounted at the projection apparatus.

Moreover, as best seen by referring to FIG. 3 a spool plate 202 is secured to the second pulley portion 190 of the transport pulley 178 by means of a suitable fastening expedient, such as the screw means 204. Spool plate 202 therefore provides a rear cover for the supply of film 24, preventing it from unintentionally slipping off the annular core or spool ring 198. Further, it will be seen that between the vertical cartridge partition wall 138 and the spool plate 202 spaced therefrom, there is formed an infeed opening 206 for the supply of film 24, this opening 206 being located at the circumferential region of the spool side or first compartment 140. Moreover, an outfeed or delivery opening 208 for the film 24 is also provided at the cartridge partition wall 138 in order to communicate the interior of the endless film supply 24 with the drive side or second compartment 142.

Having now established that the endless supply of film 24 is paid off from the inside of the film roll or supply, moving through the film outfeed opening 208, and is again wound onto the outside of such supply onto the annular core or spool ring 198 while moving through the film infeed opening 206, it will be apparent that the inventive prethreaded film cartridge assembly 22 must be equipped with mechanism for appropriately guiding the endless film 24 in a prescribed path through the drive side or second compartment 142 of the aforesaid cartridge assembly. The invention contemplates the provision of mechanism suitable for this purpose which, in the main, embodies a series of film guide or deflecting rollers, also preferably formed of plastic such as molded transparent polystyrene, and which are appropriately disposed at various suitable locations at the cartridge partition wall 138. Specifically, in the exemplary illustrated embodiment as the tape 24 moves out of the film outfeed or discharge opening 208 it passes beneath a freely mounted roller 210, is trained about such through an angle of approximately 180° to pass beneath a further freely mounted roller 212, then over the sprocket wheel 182, with the sprocket openings of the film 24 then engaging with the sprocket teeth 184. From this location the film 24 passes beneath a further freely rotatable roller 214, then over the further freely rotatable rollers 216 and 218 located forwardly of the sprocket wheel 182 in the vicinity of the upper rim portion 166. Next, the film 24 passes downwardly, substantially parallel to the front wall 146 past the semicircular opening 148, also past the film guide roller 152 and the loop compartment 150, the lateral guard plate 154 preventing the film from unintentionally sliding off the aforesaid film-guard roller 152. Now, the film 24 begins to move in a direction back towards the sprocket wheel 182, and specifically, is trained beneath a freely mounted stabilizer roller 220 carried by a so-called stabilizer assembly 222 which will be considered in detail shortly, and then is trained over a further freely rotatable roller 224 disposed adjacent the sprocket wheel 182. From this location the film 24 passes beneath the sprocket wheel 182 into engagement once again with the sprocket teeth 184 thereof, arriving at a further roller 226 before it enters between the substantially parallel film guide plates 228. Thereafter, the film 24 passes beneath a further roller or pulley 230 disposed at the outlet side of the parallel guide plates 228, moving upwardly towards the upper rim portion 166, to pass over a further guide pulley 232 just prior to entry of the film into the film infeed opening 206. Here again, it is mentioned that all of these rollers or pulleys may be formed of plastic, such as molded transparent polystyrene for instance.

Figure 7:
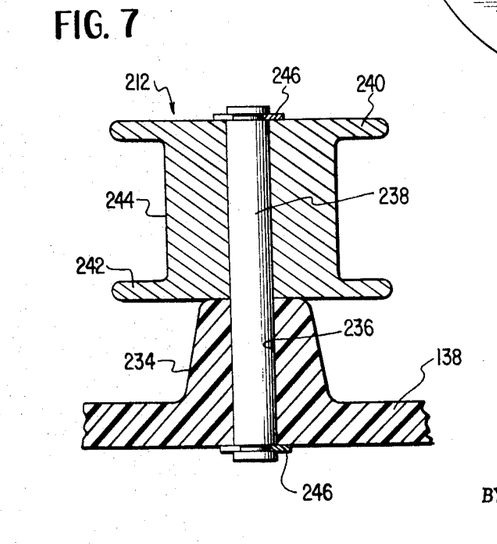
FIG. 7 is a fragmentary cross-sectional view showing a possible form of mounting of the guide roller means for the film loop of the tape supply which is moved in a prescribed path of travel through the prethreaded film cartridge assembly.

Considering further for the moment the plastic rollers or pulleys at the drive side or second compartment 142 which are provided for the specific purpose of properly guiding the supply of film 24 through the prescribed path within such compartment, it will be recalled that these rollers are advantageously mounted at the vertical partition wall 138 of the cartridge housing or casing 136. FIG. 7 specifically discloses exactly how a typical one of these rollers, such as the double-flange roller 212 is mounted at the vertical partition wall 138. More precisely, it will be recognized that this partition wall 138 of the cartridge housing 136 is provided with a protruding raised portion or projection 234 having centrally located thereat a bore 236 intended to receive a support shaft 238 for the associated roller, in this case the film guide roller 212 provided with the two end flanges 240 and 242. It should further be apparent that between the roller flanges 240 and 242 there is disposed the roller center portion 244 of such roller over which the film 24 travels, with the aforesaid flanges 240, 242 preventing any lateral displacement of such film off this center portion 244. The latter also serves to maintain the film 24 against the sprocket wheel 182.

Further, in order to prevent the roller 212 from slipping off the support shaft 238 and to maintain the flange 242 snugly seated against the raised projection 234 suitable spring clips 246, or equivalent structure, are mounted at the opposed free ends of the aforesaid support shaft 238, as clearly shown in FIG. 7. Not only, as already mentioned, do the flanges, such as flanges 240, 242 of the roller 212 maintain the supply of film passing over such roller properly located at the center portion 244 thereof, but it will further be appreciated that in the case of the double-flanged rollers 212, 214, 224, and 226 which are circumferentially spaced about the periphery of the sprocket wheel 182, the associated pair of flanges of each of these film guide rollers additionally assist in holding the sprocket wheel 182 in place. Also, it will be recognized that as far as the freely mounted roller 210 and the film guide roller 152 is concerned such are not double-flanged rollers, the former having only a single flange adjacent the vertical partition wall 138 and the latter being flangeless. Moreover, while the foregoing represents one possible mode of mounting the various rollers which guide the film through the prescribed path within the second compartment or drive side 142, it would be readily possible to use any other suitable type of mounting arrangement.

It will be remembered that it was previously explained the film 24 on its way back to the sprocket wheel 182 passes beneath a freely mounted stabilizer roller 220 of a so-called stabilizer assembly 222. This stabilizer assembly 222 constitutes an important component of the inventive apparatus and therefore will be now considered in detail. Specifically, stabilizer assembly or means 222 embodies a pair of spaced parallely extending arms 248, between the free ends of which there is appropriately mounted for rotation the freely rotatable stabilizer roller 220. Between these parallel arms 248 and rearwardly of the stabilizer roller 220 there is provided a rearwardly extending plate member 250, at the forward end of which there is formed a beveled surface 252 over which the film 24 passes on its way to the double-flange roller 224. Furthermore, the stabilizer assembly 222 is pivotably mounted by means of the pivot shaft 254, as best shown in FIG. 4, to the vertical partition wall 138 of the cartridge housing 136. Behind and adjacent this pivot shaft 254 there is a post member 256, also mounted at the vertical partition wall 138.

Now, it will be observed that a suitable stabilizer spring means 258 is coiled about the post 256 and the pivot shaft 254 in a manner that a linear spring portion 260 extends from the pivot shaft 254 in the direction of the freely mounted stabilizer roller 220 and a rearwardly flexed portion 262 is doubled back towards the previously mentioned pivot shaft 254 to an extent that its free end 264 bears upon the stabilizer plate 250. Moreover, at the region of the post 256 the stabilizer spring 258 has a downwardly depending U-shaped portion 266 which may be moved manually to the right of FIG. 4 and brought into engagement with a suitable spring retaining means or engaging slot or recess 268 of a spring retaining element 270 which is also carried by the vertical partition wall 138. Hence, when the downwardly depending spring arm 266 is moved into engagement with the spring retaining recess 268 the stabilizer assembly 220 is loaded by the spring 258 so that the free end 264 bears upon the stabilizer plate 250 with sufficient force to urge the roller 220 downwardly in FIG. 4 and into engagement with the film 24 passing therebeneath, to thereby appropriately tension the film loop extending between the rollers 214 and 224.

Now, in order to make absolutely certain that the endless supply of film 24 has been properly loaded or threaded so that the desired size loop appears when the stabilizer assembly 222 is loaded by the spring 258, the free end of the stabilizer assembly 222 at the region of the stabilizer roller 220 is provided with a suitable marker or the like which should align with a molded arrowhead 272 at the vertical partition wall 138 if the film has been properly threaded. In other words, in the event that the marker on the stabilizer assembly 222 does not line up with the arrowhead 272 then it will be apparent that the supply of film has not been properly threaded in the cartridge assembly, and consequently, an adjustment or rethreading must be undertaken to insure for the proper positioning of the aforesaid stabilizer assembly 222 when spring loaded. On the other hand, if the stabilizer assembly 222 properly aligns with the arrowhead 272 such signifies that the film 24 has been properly threaded and, in turn, will insure that when the motion picture projector 10 is placed into operation the film will automatically adjust to a desired picture or frame separation——assumed to be 18 frames for instance——between the film gate assembly 40 and the sound head 68 so as to guarantee for proper synchronization between the sound and the picture, and as will be further developed shortly. Hence, the desired length of film, in other words the picture or frame separation between the film gate assembly 40 and the sound head 68 is controlled by tightening the spring 258 my moving the downwardly depending spring arm 266 thereof to the right and into engagement with the spring retaining means or recess 268.

D. Operation of the Described Overall Apparatus

Let it be assumed that a suitable supply of film 24 (e.g. about 163 feet) has been properly loaded on the spool side or first compartment 140 around the spool ring 198 and that this endless supply of film has been properly trained in a loop form which is in a plane substantially parallel to the tape supply about the various rollers and sprocket wheel at the drive side or second compartment 142, in the manner previously considered during the description of the prethreaded film cartridge assembly 22. Further, let it be assumed that all of the operating components are in the proper position, in other words that the control knob or lever 48 is in its lowermost position within the associated arcuate slot 84 as shown in FIG. 2, so that the aforementioned prethreaded cartridge assembly 22 can be mounted at the projection apparatus 10. Now, to insure for the desired frame separation between the film gate assembly 40 and the sound head 68 which, it will be recalled, was assumed to be an 18 frame separation, the downwardly depending arm 266 of the stabilizer spring 258 is moved to the right of FIG. 4 and into engagement with the spring retaining recess 268. Hence, the stabilizer assembly 22 is loaded by this spring 258, thereby urging the stabilizer assembly 222 and the associated stabilizer roller 220 downwardly into a position where the marker on the stabilizer assembly 222 should come into proper alignment with the arrowhead 272 previously considered and formed at the vertical partition wall 138. This downward movement of the spring stabilizer assembly 222 insures that a proper size film loop will extend from the roller 214 about the rollers 216, 218, 152, 220 and 224, and thus, that there will be a proper, desired frame separation between the gate assembly and sound head, and accordingly, the required synchronization between the picture and sound track.

Now, the prethreaded film cartridge assembly 22 is ready to be mounted at the projection apparatus 10, and therefore, since it has been assumed that the control knob or lever 48 is in the proper lowermost position of FIG. 2 the gate 88 is pivoted away from the gate plate 86 to provide a space between these members capable of receiving the film 24 therebetween. Specifically, this control knob or lever 48 is then passed through the enlarged portion 174 of the T-shaped slot 172 and the drive stub shaft 54 of the drive assembly 50 is placed into driving engagement with the central bore 186 of the transport pulley 178, at the same time the drive spike 62 engaging with one of the fan holes 188. Likewise, the forwardly protruding portion or free end of the gate plate 86 as well as the frame adjusting lever 44 piercingly extend through the slot 162 of the cartridge assembly 22. Now, the projection apparatus 10 is ready to be started and this is accomplished by lifting the control knob or lever 48 upwardly within the associated arcuate slot 84. The film gate 88 now shuts over the film and holds it fast. Also, the stabilizer assembly 222 of the prethreaded film cartridge assembly 22 is raised upwardly by means of the pin member 82 carried by the upwardly inclined lever portion 114 of the previously considered lever system 104. Consequently, the portion of the film 24 located beneath the gate assembly 40 is freed and at the same moment as the film is pushed against the sound drum or roller 70 and the sound head 68, the machine is placed into operation by appropriate actuation of the microswitch means 134. Now, a film loop is formed between the stabilizer roller 220 and the film gate assembly 40 in the loop compartment 150 formed at the front wall 146 of the cartridge housing or casing 136. This film loop is slightly too large and in a fraction of a second will move slightly away from the place in the loop compartment 150 when the film advancing claw 42 falls into the closest sprocket or perforation hole in the film, here assumed to be number 18 from the sound head 68. Accordingly, the motion picture apparatus will now operate faultlessly and reliably reproduce the visual and audible information carried on the film in the conventional manner. Any slight frame adjustment, if necessary, can be carried out in the usual manner by the frame adjusting lever 44.

Owing to the synchronous feeding out, running and winding-up of the film on the same shaft, this film is not exposed to friction, wear and tear as in earlier known prior art endless film spool devices. Moreover, as already explained, the film adjusts itself automatically to a desired frame separation, that is, e.g. 18 frames, between the film gate assembly 40 and the sound head 68.

While there has been shown and described a present preferred embodiment of the invention, it is to be distinctly understood that the invention is not limited thereto but may be otherwise variously embodied and practiced within the scope of the following claims.

I claim:

1. In combination:
   a. a projection apparatus having at least a gate assembly thereon, said projection apparatus being provided with sound reproducing means including a sound head;
   b. a film cartridge assembly;
   c. means for releasably mounting said film cartridge assembly at said projection apparatus;
   d. film supply means carried by said film cartridge assembly, said film supply means having a film loop extending therefrom;
   e. guide means for guiding said film loop through a prescribed path of travel in said film cartridge assembly;

f. said film cartridge assembly including a displaceably mounted stabilizer assembly cooperating with said film loop to insure for a desired frame separation between said gate assembly and said sound head;

g. means cooperating with said stabilizer assembly for urging the latter into a predetermined position;

h. means for displacing said stabilizer assembly from said predetermined position wherein said film loop is in tensioned condition into a position wherein said film loop is freed below said gate assembly, said displacing means including a displaceable pin means movable into a position to bear against said stabilizer assembly;

i. lever means carrying said pin means, and a control member for selectively displacing said lever means and said pin means carried thereon between a first position and a second position;

j. means defining a loop compartment at the predetermined location between said gate assembly and said stabilizer assembly;

k. said gate assembly comprising a stationary gate plate and a cooperating pivotably mounted gate, said lever means coacting with said gate when said lever is in said first position to maintain said gate in a position away from said gate plate prior to placing in operation said projection apparatus;

l. cooperating drive means on said projection apparatus and said film cartridge assembly for driving said film supply means; and m. switch means for enabling operation of said projection apparatus, said lever means being selectively engageable with said switch means to open said switch means in said first position of said lever;

n. whereby in said first position of said lever means, said switch means is opened to inactivate said projection apparatus, said pivotal gate is maintained away from said gate plate, said stabilizer assembly is urged toward said predetermined position wherein said film loop is in tensioned condition; and o. in said second position of said lever means, said pivotal gate is released to secure said film loop in said gate assembly, said stabilizer assembly is displaced to said position wherein said film loop is freed below said gate assembly, said film is placed into operable association with said sound reproducing means, and said switch means is closed to enable operation of said projection means.

2. The combination defined in claim 1, wherein said film supply means and said film loop are disposed in respective substantially parallel planes.

3. The combination as defined in claim 1, wherein said urging means comprises spring means for biasing said stabilizer assembly into said predetermined position.

4. The combination as defined in claim 1, further including marker means cooperating with said stabilizer assembly to enable determination that said stabilizer assembly has been biased into said predetermined position to form a desired size film loop when said film cartridge assembly has been properly loaded with film.

5. The combination as defined in claim 1, further including a film guide roller disposed adjacent said loop compartment.

6. The combination as defined in claim 1, wherein said stabilizer assembly includes a stabilizer roller past which moves said film loop.

7. The combination as defined in claim 1, wherein said cooperating drive means on said projection apparatus and film cartridge assembly includes a drive assembly on said projection apparatus and a transport pulley including a sprocket wheel on said film cartridge assembly.

8. The combination as defined in claim 7, wherein said drive assembly includes a drive stub shaft and a drive spike, said transport pulley being provided with a substantially central bore intended to receive said drive stub shaft and a plurality of fan holes intended to receive said drive spike.

9. The combination as defined in claim 1, wherein said projection apparatus is provided with a substantially vertical partition wall, said vertical partition wall having slot means through which said pin means piercingly extends, said lever means being located behind said vertical partition wall.

10. The combination as defined in claim 3, wherein said sound reproducing means further includes a sound roller, a pivotally mounted, spring-biased support means carrying a roller cooperating with said sound roller, and control means for displacing said support means in a direction towards said sound roller and sound head.